United States Patent [19]
Mazza

[11] Patent Number: 4,685,625
[45] Date of Patent: Aug. 11, 1987

[54] GRINDING MILL

[76] Inventor: Frank Mazza, 4897 Barclay, Apt. 4, Montreal, Quebec, Canada, H3W 1E1

[21] Appl. No.: 832,881

[22] Filed: Feb. 26, 1986

[30] Foreign Application Priority Data

Mar. 6, 1985 [CA] Canada ................................ 475858

[51] Int. Cl.⁴ .............................................. B02C 7/11
[52] U.S. Cl. ................................... 241/36; 241/37.5; 241/100; 241/101.2; 241/169.1; 241/285 R; 241/285 A
[58] Field of Search .................... 241/33, 36, 37.5, 98, 241/100, 101.2, 168, 169.1, 257 R, 285 R, 285 A, 285 B

[56] References Cited

U.S. PATENT DOCUMENTS 2,795,382  6/1957  Francesch .
3,281,636  10/1966  Fleckenstein et al. .
3,518,711  7/1970  Radcliffe .
3,734,417  7/1973  Russel et al. .
4,121,779  10/1978  Mills et al. .

FOREIGN PATENT DOCUMENTS 941643  6/1952  Fed. Rep. of Germany .

Primary Examiner—Timothy V. Eley
Attorney, Agent, or Firm—Samuel Meerkreebs

[57] ABSTRACT

An electric cordless mill for grinding, for example peppercorns, comprising a first housing comprising an inner portion and an outer portion rotatably mounted thereon. Electrical switch means are provided in the housing and are operable upon relative rotary movement between the first and second portions. The housing further includes power means for use in powering the mill and is controlled by the switch means. A second housing is secured to the first housing via a bayonent connector means. The second housing includes an electric motor connected to the power means via a connector means. The motor drives a milling means, operation of which is controlled by the switch means. Door means are provided adjacent the discharge end of the milling means, operative control of which is effected by the switch means and a rotatably mounted adjustment ring is intermediate the first and second housings for use in adjusting the milling means whereby to provide a selected fineness of grind.

18 Claims, 4 Drawing Figures

GRINDING MILL

BACKGROUND OF THE INVENTION (a) Field of the Invention

The present invention relates to a mill for grinding, for example, peppercorns or the like. It particularly relates to a hand held electrically operated, cordless mill and improvements therein.

(b) Description of the Prior Art

Grinding mills of the aforementioned type are known and include that disclosed in Russell et al's U.S. Pat. No. 3,734,417 dated May 22, 1973.

A major drawback regarding the aforementioned patented mill and the others of the prior art, is that they do not permit a large range of grind fineness, and in the case of the aforementioned patented mill, requires its dismantling in order to make adjustment between grind sizes. This is not only inconvenient to the user, but requires many detachable parts which can become lost.

A further drawback regarding the prior art electric mill is that there is no intermittent action provided during the grinding action, affording user reaction time to gage the amount of ground pepper flowing from the mill. Furthermore, the functioning of the known mill, due to its utilizing a gravity type switch for its operation requires the constant inverting and righting of the mill, thus creating an undesirable mixture of ground and unground peppercorns in the mill. This is contrary to the purpose of a peppermill which is to provide fresh ground pepper.

SUMMARY OF THE INVENTION

It is therefore a prime object of the present invention to provide a grinding mill of the aforementioned type which overcomes the aforementioned drawbacks.

It is a further important object of the present invention to provide an improved design of mill, including one which can be readily declogged of grind from its grinding means.

In one aspect of the present invention there is provided an electric cordless mill for grinding, for example peppercorns. The mill comprises a first housing comprising an inner portion and an outer portion rotatably mounted thereon, and means for selectively interlocking the inner portion and outer portion together in order that they may be rotated in unison. Electrical switch means is provided in the housing and operable upon relative rotary movement between the outer and inner portions, the housing further including power means for use in powering the mill and controlled by the switch means. A second housing is rotatably connected to the first housing, the second housing comprising an electric motor means connected to the power means. The motor means is drivingly connected to a milling means, operation of which is controlled by the switch means.

In a more specific embodiment, door means are provided adjacent the discharge end of said milling means, operative control of which is effected by the switch means. A rotatably mounted abutment means intermediate the first and second housings may be provided for adjusting the milling means to provide a selected fineness of grind.

BRIEF DESCRIPTION OF THE DRAWINGS

The invention is illustrated by way of example in the accompanying drawings wherein.

DESCRIPTION OF PREFERRED EMBODIMENTS

Referring now in detail to the drawings.

Figure 1:
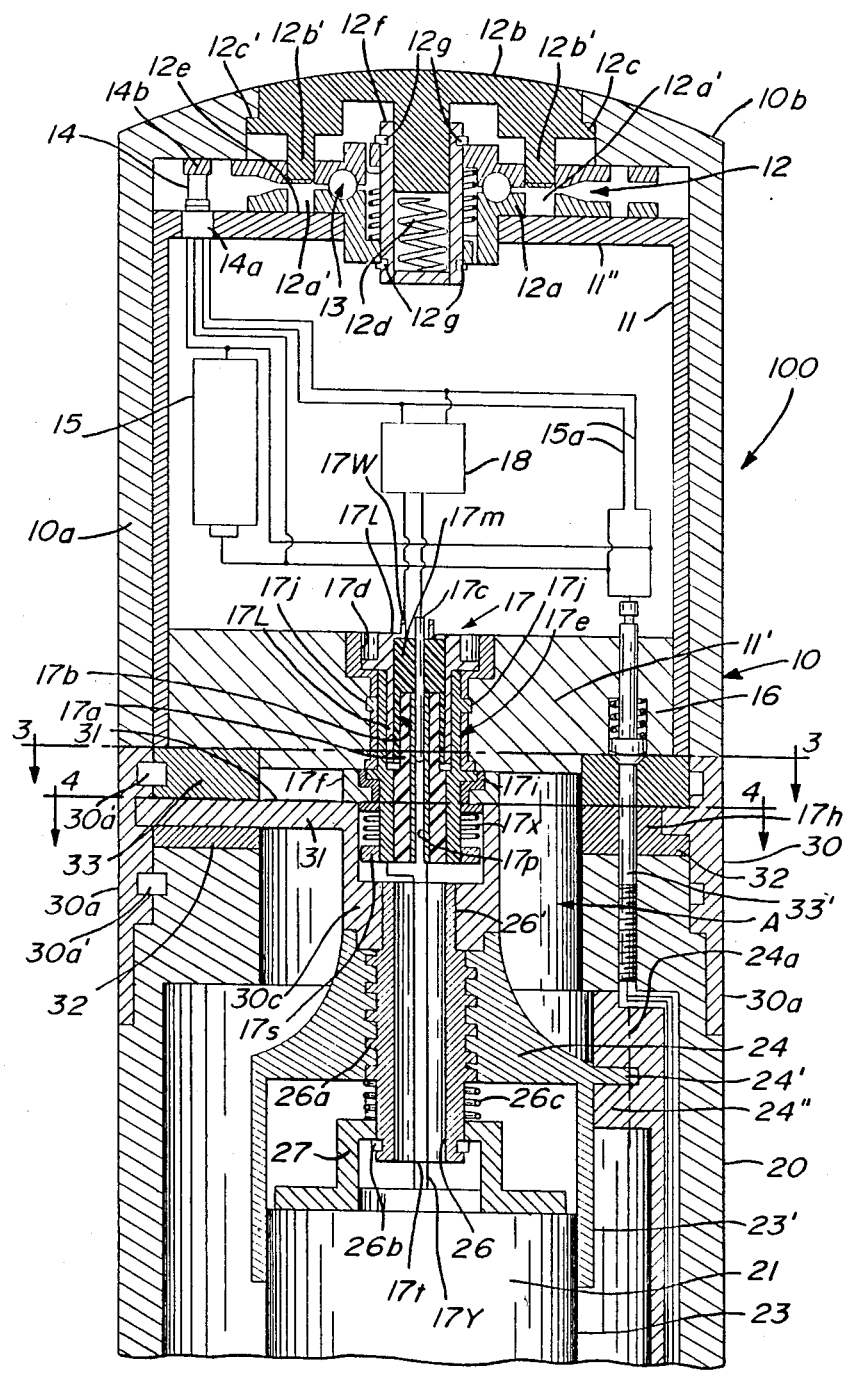
FIG. 1 is a sectioned elevational view of the upper half of a grinding mill in accordance with the present invention.
Figure 2:
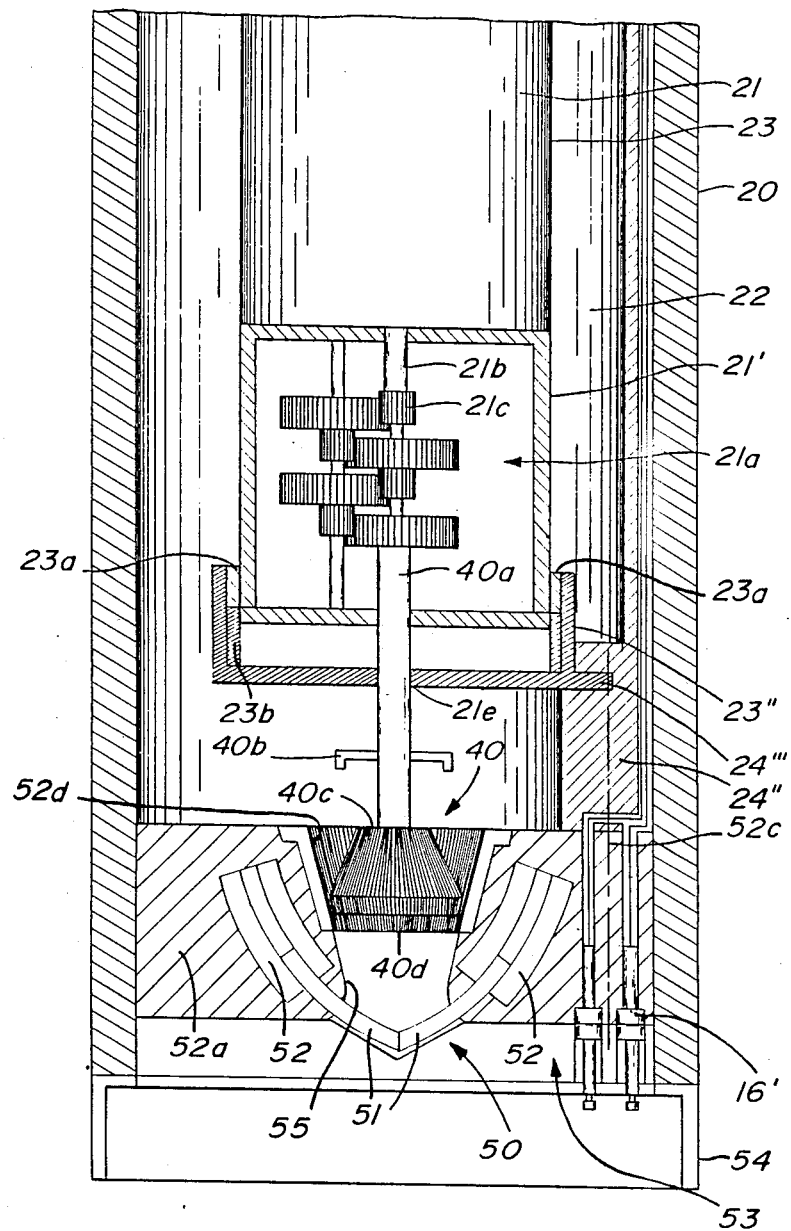
FIG. 2 is a sectioned elevational view of the lower half of a grinding mill in accordance with the present invention.

FIGS. 1 and 2 jointly illustrate generally an electric cordless mill 100 for grinding, for example peppercorns, in accordance with the present invention. Mill 100 is seen to comprise a first housing 10; a second housing 20 and a rotatably mounted abutment means 30 intermediate housings 10 and 20.

First housing 10 comprises an inner portion 11 and outer casing 10a which are concentric and the outer casing 10a is adapted to rotate relative to inner portion 11. First housing 10 further includes a means 12 for interlocking inner portion 11 and the outer casing 10a together so that they may be rotated in unison for the purpose of separating the first housing 10 from the second housing 20.

The first housing 10 is in the shape of a cylindrical shell having a close top part 10b. The outer casing 10a is open at its other end while the inner portion 11 is closed off by a wall 11'. The inner portion 11 includes a top wall 11". The inner portion 11 defines, with the top wall 11" and the the bottom wall 11' a chamber in which is housed an electric circuit including battery 15. Leads 15a communicate battery 15 with terminals 16 provided in the wall 11'. The terminals 16 may be utilized for connection to an AC recharging member (not shown) when the housing 10 is separated from housing 20. As will be described later they also can communicate with conductors 33' and extensions to terminal 16' at the bottom of the housing 20 for purposes of mounting the complete mill 100 to a recharging unit.

The outer casing 10a is adapted to rotate through a limited arc relative to the inner portion 11 which when mounted to the housing 20 is fixed thereto. A switch device 14 is provided for the purpose of activating a circuit, and the switch normally interrupts the circuit from the battery 15. The switch 14 includes contact element 14b mounted on the top wall 10b of the outer casing 10a adapted to contact the contact element 14a which in turn is mounted on the upper wall 11" of the inner portion 11. The outer casing 10a is normally in a position wherein the switch 14 is open, that is the elements 14b and 14a are not in contact with each other. As will be described later, when the outer casing 10a is rotated clockwise against a coil spring (not shown), the element 14b will come into contact with contact element 14a to complete the circuit from the battery 15. A stop is also provided to limit the rotational movement of the outer casing 10a relative to the inner portion 11. The stop element would coincide with the contact element 14b being in contact with the contact element 14a.

The housing 10 is detachably mounted to the housing 20 as previously described. This is accomplished by a bayonet type connection between the two housings. Reference is made to FIG. 1 and bayonet connector is generally denoted by the numeral 17. The female portion of the bayonet connector 17 includes a sleeve 17d fitted in the wall 11'. The sleeve 17d includes an enlarged upper cylindrical portion and elongated tubular sleeve portion. The elongated tubular sleeve portion is provided with a pair of opposed L-shaped slots identified by the numeral 17k. The slots 17k open at the bottom of the tubular sleeve portion of the sleeve 17d and terminate in a 90° portion forming the foot of the L at the level of pin 17j shown in FIG. 1. The female portion of the connector 17 is also provided with conductor elements 17L which is snugly fitted in the enlarged cylindrical portion of the sleeve 17d as shown in FIG. 1 and can be welded therein. The conductor element 17L has an upstanding cylindrical collar 17w to which a wire from the electrical circuit is connected. The conductor 17L also has a downwardly depending sleeve portion which defines with the sleeve 17d an annular recess.

Concentric within the conductor element 17L is an insulating member 17m having a downwardly depending sleeve co-extensive with the downwardly depending sleeve of conductor element 17L. The downwardly directed sleeve identified 17b from the insulators 17m provides a cylindrical socket for receiving the male portion of bayonet connector 17. Finally, the insulator 17m is provided with a lance 17c extending through a bore in the insulator 17m and protruding centrally within the sleeve 17b. The lance 17c is electrically connected to the battery 15.

The male portion of the connector 17 is first of all mounted on a ring 33 which is securely fixed to housing 20 by means of elongated screws 33' which extend into the material forming the wall of the housing 20 as shown in FIG. 1. The screws 33' at the same time act as conductors for the leads 15a which will be described further.

A pair of spokes 17g extend radially inwardly from the ring 33 and mount a centrally located support ring 17f. The ring 17f which is formed having a shoulder as shown in the drawings seats an insulating sleeve 17i which in turn supports the male tubular bayonet element 17e. The bottom of the bayonet member 17e is provided with a nut 17s which makes captive a spring 17x extending between the nut 17f and the insulator member 17i. The upper portion of the male tube member 17e includes a pair of opposed pins 17g which are adapted to fit in L-shaped slots 17k provided in the female sleeve 17d. The upper portion of the tube 17e is adapted to fit smoothly within the annular recess formed between the sleeve 17d and the conductor element 17L. The centrally located upwardly projection member 17a is fixedly mounted to the male tube member 17e and is provided with a central bore in which is a conductive tube 17p which extends the length of the bore and is adapted to receive the lance 17c from the female portion.

An electrical lead 17t extends from the bottom of the tube 17e and is connected to the motor 21. A further lead 17y extends from the conductor tube 17p to the motor 21.

In operation, when it is required to disconnect the top housing or the first housing 10 from the housing 20 the wall 17n will be rotated as will be described further, to a point where the pins 17j are aligned with the axial part of the slot 17k and thus the housing 10 can be pulled axially away whereby the pins 17j follow along the axial slot 17k until they are completely free of sleeve 17d. Likewise, the lance 17c slides out of the conductor tube 17p. In order to assemble the two housings an opposite operation will occur whereby the lance 17c will be aligned with the conductor tube 17p and the tube 17e with its pins 17j are inserted within the sleeve 17d with the pins aligned with the axial portions of the slot 17k. The spring 17x is provided to apply downward pressure on the pins 17j against the surface of the slot 17k. The electrical communication is provided through the conductor member 17L and lance 17c through the sleeve 17e and tube 17p, finally to the leads 17t and 17y connecting the sleeve 17e and tube 17p respectively to the motor 21.

Interlock 12 comprises a ball bearing assembly 11 having a race 12a with pin sockets 12a' therein, race 12a is secured to inner portion 11. A finger button 12b has pin portions 12b' adapted to enter into respective sockets 12a'. As seen from FIG. 1, finger button 12b is captively and rotatably secured within housing 10, by virtue of flange 12c abutting shoulder 12c' on housing 10 and urged thereagainst by spring 12d. Seating faces 12e provide stops for respective pin portions 12b'. Thus disengagement of pin portions 12b' from socket portion 12a' is maintained by coil spring 12d located centrally of interlock 12 and guided within tubular container 12f supported on locking ring 12g. Accordingly, upon pressing finger button 12b inwardly of housing 10, the depending pins 12b' will engage sockets 12a' affording rotary movement of inner portion 11 with housing 10 upon rotary movement thereof. Registry of pins 12b' with sockets 12a' is effected by the aforementioned spring means associated with parts 14a and 14b of switch means 14. Alternatively, suitable markings may be provided on housing 10 to align with ones on member 30 to aid alignment of pins 12b' with sockets 12a'.

The ball bearing assembly 12 ensures smooth rotary movement between housing 10 and inner portion 11 when in a non-engaged mode.

In another embodiment the casing 10a and inner portion 11 would be one piece. In such a case the rotating switch 14 and disconnect plug including the finger button 12b would be dispensed with and replaced by a single sensor switch in the place of the finger button 12b. The sensor switch of a well known type would open or close the electrical circuit from the battery 15 thus supplying power to the motor 21 in the same manner as the present switch 14. Thus, the relative rotation of the elements in the housing 10 is not necessary and therefore the housing 10 can be made in one piece.

Referring now to FIG. 2, second housing 20, which comprises an inner chamber 22, is secured, as mentioned above, to housing 10 by coaxial bayonet connector 17. Chamber 22 houses electrical motor 21 and a gear train 21a for drivingly connecting electric motor 21 to the mill device 40 of the mill 100. The motor 21 and accordingly milling device 40 is operationally controlled by switch 14. Adjacent the base of mill 100 and below the milling device 40, i.e. adjacent the discharge end of milling means 40, is provided a chute door assembly 50 opening and closing of which is also controlled by operation of switch 14.

Referring to FIGS. 1 and 2, motor 21 is cylindrical as is the gear housing 21' housing gear train 21a. Housing 21' is fixedly secured to motor 21 (housing) by screws.

Motor 21 and housing 21' together provide an elongated cylindrical member 23 which is supported centrally within chamber 22 by a first cylindrical sleeve 23' (FIG. 1) and a second cylindrical sleeve 23'' (FIG. 2).

The annular yoke 24 is supported by three circumferentially spaced legs 24', one of which is seen in FIG. 1. Legs 24' are in turn fixedly supported on three respective axially extending members 24''. A sleeve 23' extends downward of yoke 24 and encompasses the top of motor 21 allowing sliding axial movement thereof. Cylindrical housing 23'' likewise is supported upon three circumferentially equispaced apart legs 24''', one of which is also seen in FIG. 2. Legs 24''' likewise are fixedly supported upon axial member 24''.

A pair of keys 23a are provided on the free end of housing 21', such being slidingly received within slots 23b in housing 23'', ensuring no relative rotary movement occurs between housings 21' and 23''.

Figure 3:
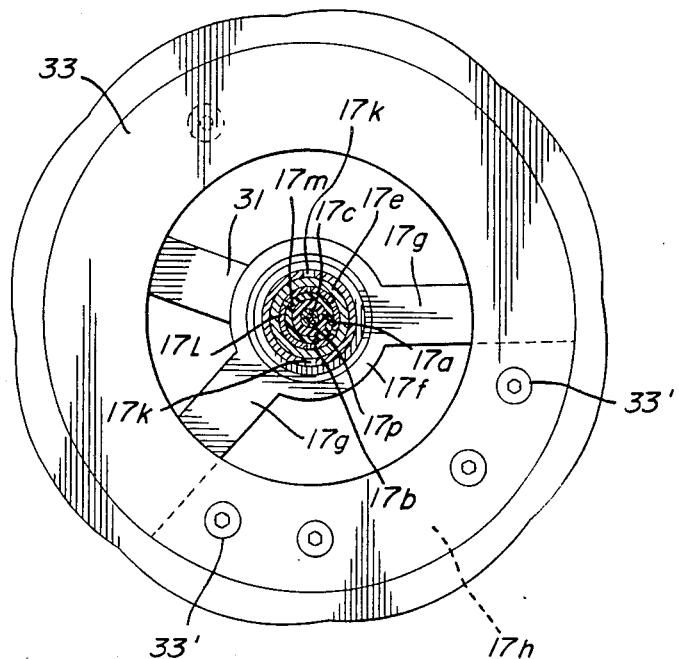
FIG. 3 is a sectional view of a portion of the grinding mill shown in FIG. 1 as taken along line 3—3 therein.
Figure 4:
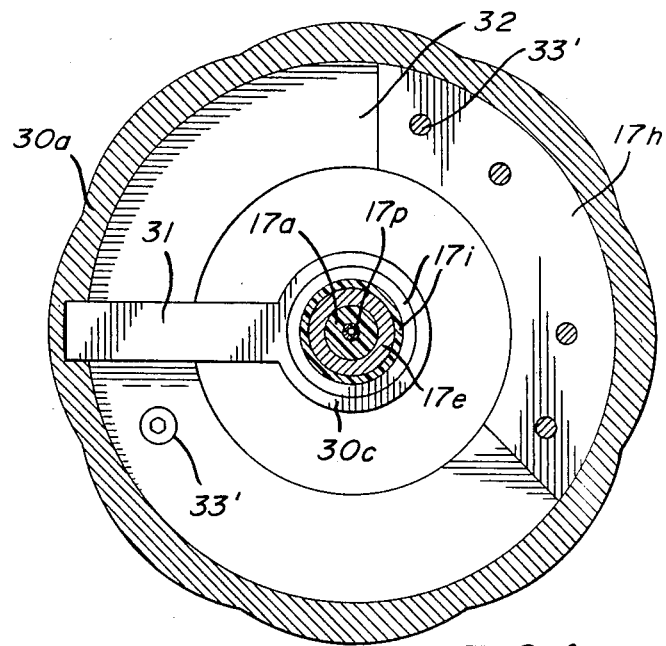
FIG. 4 is a sectional view of a portion of the grinding mill shown in FIG. 1 taken along line 4—4 therein.

Reference is made to FIGS. 1, 3 and 4 showing member 30. Member 30 comprises an annular ring member 30a exposed to the exterior and located between housing 10 and 20. As best seen in FIGS. 1 and 4, a spoke 31 supports a central sleeve 30c having a pair of internal flats 26', ensuring positive rotation of shaft 26 thereby. As seen from FIGS. 1 and 4, spoke 31 is integrally connected to annular member 30a and is slidingly supported upon a thrust ring 32, positively secured to housing 20 by screws 33'. Screws 33' pass through ring 33 arcuate sement 17h, thrust ring 32 to housing 20. Top ring 33 which together with thrust ring 32, sandwiches segment 17h. The space between ring 33 and 32 as delimited by segment 17h provides for the arcuate movement of spoke 31 and ring 30a. As noted, annular member 30a is also slidingly secured to annular ring 33 by a suitable commercially available race means 30a'. Annular member 30a is similarly supported on housing 20 by race 30a''.

Yoke 24 is rigidly secured for non-rotary movement within chamber 22 and provides a solid support for threaded hollow shaft 26 via threads 26a. Shaft 26 is connected to motor 21 by way of a bracket 27 mounted to the motor and locking ring 26b and is key connected to member 30c, thus ensuring shaft 26 is rotated upon rotation of member 30 relative to housing 20.

A spring 26c is provided intermediate the motor 21 and yoke 24, permitting sliding reciprocal movement of motor means 21 on shaft 26 against pressure of spring 26c, which is important when it becomes necessary to declog milling device 40 as discussed hereinafter.

Rotational movement of shaft 26 effected by hand movement of member 30 in a first direction, displaces elongated member 23 comprising motor 21 and housing 21' axially of cylindrical housing 23''. This axial movement causes milling device 40 to move axially relative to the grinding seat 52d thereby increasing or decreasing the space therebetween to provide a range of grinding size.

The remainder of the chamber 22 surrounding the housings 24, 23', motor 21, housing 21' forms a storage area for the peppercorn to be ground. An annular passage A communicates the chamber 22 with the filling opening as will be described.

Motor means 21 includes drive shaft 21b extending through the adjacent end wall of housing 21' to support a drive pinion 21c drivingly engaging gear train 21a.

An output drive shaft 40a extends from gear train 21a, such passing through the further end wall of housing 21' and the wall of housing 24''', providing a bearing support 21e therefor. A material agitator means 40b comprising a plurality of spoke like members having depending ends, is affixed to drive shaft 40a adjacent milling means 40.

Referring again to FIG. 2, it will be seen milling device 40 comprises a rotor 40c spaced from grinding seat 52d ending at the discharge opening 40d. Rotor 40c includes a pair of frustoconical serrated grinding faces 40e and 40f angularly disposed one to another, with face 40f being inclined generally parallel with the single serrated cutting surface of the seat 52d.

As indicated, adjacent the discharge end of milling means 40 and in spaced relation thereto, is provided a chute door assembly 50 for controlling the discharge of grinds leaving mill 100. Door assembly 50, as seen from FIG. 2, comprises a pair of curvilinear shaped doors 51 which are slidingly received within curved slots in body 52a which include curved solenoids 52 and controlled by operation of switch 14.

A wide mouth 53 is provided below doors 51 to ensure unimpeded discharge of the grinds from chute 55.

Operation of mill 100 will now be described. Firstly, to load mill 100, with peppercorns, finger button 12b is depressed to lock inner portion 11 and first housing 10 together, pins 12b' being pre-aligned with sockets 12a' by virtue of part 14b of switch means 14, abutting its associated stop means under pressure of its associated spring means, as aforedescribed. First housing 10 is then rotated relative to second housing 20 (and member 30) in a counter-clockwise direction, affording coaxial bayonet connector 17 to be disengaged i.e. causing pins 17j to be removed from their "L"-shaped slots in socket 17d, permitting first housing 10 to be pulled directly off and away from second housing 20. Thus, the peppercorns can be paired into housing 20 through the opening A seen in FIG. 1 in order to fill chamber 22. First housing 10 is then refitted to second housing 20. Inner portion 11 including member 11' is seated upon annular ring 33 and engaging the parts comprising coaxial bayonet like connector 17, and rotating first housing 10 upon second housing 20 in a clockwise direction to engage pins 17j securely within their "L"-shaped slots in socket 17d and thereby positively connect housings 10 and 20 via coaxial bayonet connector 17.

Member 30 may be rotated relative housings 10 and 20 to adjust rotor 40c relative to grinding seat 52d to provide a selected grind size. To facilitate this, a series of graduation marks (not shown) are provided on one of housings 10 or 20 along with a cooperative mark on abutment means 30.

First housing 10 which is automatically disengaged from inner portion 11 for reason of button 12b being released and being under spring pressure is then rotated relative to second housing 20 and abutment means 30 (in clock-wise direction through an arc of approximately 10°, being the spaced distance between switch parts 14a and 14b, against the pressure of the spring means between the switch parts) thus causing parts 14a and 14b of switch means 14 to contact and motor 21 to be activated and thus the milling device 40 to operate. Immediately doors 51 open by means of solenoid 52 and then the milling device 40 starts to operate. The grinding cycle is a 4:1 ratio relative to the contact time of the switch 14. Thus, when the housing 10a is released the spring means associated with the switch will cause the housing 10a to return to its initial position thereby disengaging the switch. The grinding operation will terminate at the end of the grinding cycle keeping in mind the 4:1 ratio of the time of the grinding cycle to the contact time. Following a short delay after the termination of the grinding operation, solenoids 52 are automatically activated causing closure of doors 51. When the device 40 is in operation, an intermittent grinding action is provided by intermittent control 18.

The grinding operation that is the operation of the milling device for milling head 40 against the peppercorns passing between the seat 52d and the grinding head 40c operates under a shock absorbing function provided by spring 26c which allows the assembly 23 including the motor 21 the gear case 21' in the bracket 27 and the shaft 40a to move in unison in an axial direction away from the seat 52d. The spring must be strong enough to apply pressure however by the grinding head 40c against the peppercorns.

In the event it is necessary to release an obstruction from between rotor 40c and seat 52d, this may be effected merely by applying pressure to rotor 40c pushing it inwardly toward yoke member 24 against the pressure of spring 26c, thereby increasing the opening between rotor 40c and seat 52d.

It is possible to provide a small light in the area below the doors 51 in order to illuminate the work area.

Recharging of the battery 15 is conveniently accomplished by placing the mill 10 on a recharging outlet receptacle 54 to engage terminals 16'.

Another important aspect of mill 100 is that its design ensures the items to be ground, e.g. peppercorns, are automatically urged and thus move continuously toward milling means 40 during operation thereof. This is aided by the elongated unobstructed annular passage extending from the filling opening A of mill 100 to the milling means 40, and also aided by agitator 40b. As a result, smooth continous operation of mill 100 is assured, providing a uniform delivery of grind therefrom and which also contributes to no-clog operation of mill 100. Thus is solved another major problem of the prior art mills, some of which rely on a gravity switch for operation thereof.

I claim:

1. An electric cordless mill for grinding, for example peppercorns, comprising in combination:
    a first housing comprising an inner portion and an outer portion rotatably mounted thereon, and means for selectively interlocking said inner portion and outer portion together whereby they may be rotated together, electrical switch means in said housing and operable upon relative rotary movement between said first and second portions, said first housing further containing power means controlled by said switch means;
    a second housing secured to said first housing via a first connector means, said second housing containing an electric motor means connected to said power means via a second connector means, said motor means drivingly connected to milling means, operation of which is controlled by said switch means.

2. An electric cordless mill for grinding hard granulate comestible material comprising in combination:
    a first housing and a second housing arranged axially and detachably secured to the first housing by connector means,
    electrical switch means in said first housing;
    said housing further containing power means controlled by said switch means;
    said second housing containing motor means operated by said power means.
    said motor means drivingly connected to a milling means for grinding said material, operation of which is controlled by said switch means, and door means adjacent the discharge end of said milling means, operative control of which is effected by said switch means;
    said second housing defining a material storage chamber communicating with said discharge end and with a filling opening arranged axially thereof and normally closed by said first housing.

3. An electric cordless mill for grinding hard granulate comestible material comprising in combination:
    a first housing and a second housing arranged axially and detachably secured to the first housing, the first housing comprising an inner portion and an outer portion rotatably mounted thereon, and means for selectively interlocking said inner portion and outer portion together in order that they may be rotated in unison,
    electrical switch means in said housing and operable upon relative rotary movement between said inner and outer portions,
    said housing further containing power means controlled by said switch means;
    the second housing being detachably secured by connector means to said inner portion of said first housing,
    said second housing containing motor means operated by said power means,
    said motor means drivingly connected to a milling means for grinding said material, operation of which is controlled by said switch means, and door means adjacent the discharge end of said milling means, operative control of which is effected by said switch means,
    said second housing defining a material storage chamber communicating with said discharge end and with a filling opening arranged axially thereof and normally closed by said first housing.

4. A grinding mill as defined in claim 3 wherein milling adjustment means is provided intermediate said first and second housings for rotatably adjusting said milling means to provide a selected fineness of grind.

5. A grinding mill as defined in claim 3, wherein said inner and outer portions each comprise a cylindrical member, said inner member slidingly engaging within said outer member.

6. A grinding mill as defined in claim 3, wherein said means for selectively interlocking said inner and outer portions comprises pin means on said outer portion adapted to engage socket means in said inner portion.

7. A grinding mill as defined in claim 3, wherein said electrical switch means comprises a micro-switch mounted on said inner portion and positioned to be engagable with an abutment on said outer portion.

8. A grinding mill as defined in claim 3, wherein said power means comprises a battery means.

9. A grinding mill as defined in claim 8, wherein battery recharging terminals are provided within said first housing adjacent the periphery thereof, to permit said first housing when detached from said second housing to be connected to a remotely located power supply, for recharging the battery.

10. A grinding mill as defined in claim 8, wherein battery recharging terminals are provided within said second housing adjacent the periphery thereof, to permit said second housing to be connected to a remotely located power supply, for recharging the battery.

11. A grinding mill as defined in claim 3, wherein said power means includes an intermittent control means for imparting an intermittent operation of said milling means.

12. A grinding mill as defined in claim 3, wherein said connector means for securing said second housing to said first housing comprises a bayonet type connection.

13. A grinding mill as defined in claim 3, wherein said door means comprises a pair of curvilinear shaped members slidingly engaged within solenoid means for imparting movement of said curvilinear shaped members respectively toward and away from one another, to close and open said door means, and said solenoid means being electrically connected to said switch means.

14. A grinding mill as defined in claim 3, wherein said rotatably mounted member between said first and second housings comprises an annular ring rotatably mounted upon said second housing and said annular ring including a radially inwardly extending spoke member mounting a stem means extending axially of said second housing, said stem means adapted for rotational movement with said annular ring and spoke but axially slidable movement relative thereto, said stem being threadedly engaged in the thread means provided in said second housing, whereby upon rotation of said annular ring in a first direction it will cause axial movement of said stem means in a first direction and upon rotation of said annular member in the opposite direction, it will cause said stem means to move in the other axial direction, said motor means and milling means being mounted in said second housing for limited axial sliding movement, said stem means being coupled to the motor means for imparting an axially reciprocal adjustable movement to said motor means and accordingly to said milling means secured thereto, to thereby adjust the grinding size of the milling means.

15. A grinding mill as defined in claim 14, wherein said second housing defines a cylindrical storage chamber for containing said material to be ground by said milling means, said motor means includes an elongated cylindrical configuration depending axially within said cylindrical chamber and being of a selected diametrical size such that an annular space is provided around said motor means.

16. A grinding mill as defined in claim 15, wherein within the space intermediate said motor means and milling means, an agitator means is provided for agitating the material prior to their entry into said milling means.

17. A grinding mill as defined in claim 15, wherein within the space intermediate said motor means and milling means, a shaft extends to connect said motor means with said milling means, said shaft including thereon agitator arms.

18. A grinding mill as defined in claim 3 wherein the material to be ground is peppercorns.

* * * * *